US009385785B2

(12) United States Patent
Edwards et al.

(10) Patent No.: US 9,385,785 B2
(45) Date of Patent: Jul. 5, 2016

(54) COMMON COMMUNICATIONS DEVICE

(76) Inventors: David John Edwards, Oxford (GB); Christopher John Stevens, Oxford (GB); Laszlo Solymar, Oxford (GB); Ekaterina Shamonina, London (GB)

(*) Notice: Subject to any disclaimer, the term of this patent is extended or adjusted under 35 U.S.C. 154(b) by 533 days.

(21) Appl. No.: 13/514,530

(22) PCT Filed: Dec. 7, 2010

(86) PCT No.: PCT/GB2010/052040
§ 371 (c)(1),
(2), (4) Date: Aug. 7, 2012

(87) PCT Pub. No.: WO2011/070352
PCT Pub. Date: Jun. 16, 2011

(65) Prior Publication Data
US 2012/0309316 A1 Dec. 6, 2012

(30) Foreign Application Priority Data
Dec. 7, 2009 (GB) .................................. 0921401.6

(51) Int. Cl.
H04B 5/00 (2006.01)
H01P 1/203 (2006.01)
B60L 11/18 (2006.01)

(52) U.S. Cl.
CPC ............ *H04B 5/0031* (2013.01); *H04B 5/0012* (2013.01); *H04B 5/0037* (2013.01);
(Continued)

(58) Field of Classification Search
CPC H01P 1/20381; H04B 5/0012; H04B 5/0031; H04B 5/0037; H04B 5/0081; B60L 11/1846; Y02T 10/7005; Y02T 10/7072; Y02T 90/121; Y02T 90/128; Y02T 90/14; Y02T 90/16; Y02T 90/163; Y02T 90/169; Y04S 30/14
USPC ........ 333/24 R, 219, 236; 343/867; 455/41.1, 455/41.2
See application file for complete search history.

(56) References Cited

U.S. PATENT DOCUMENTS

2007/0024399 A1* 2/2007 Antolin et al. ................. 333/205
2008/0119135 A1* 5/2008 Washiro ............... H04B 5/0012
455/41.1

(Continued)

FOREIGN PATENT DOCUMENTS

WO 03105308 A1 12/2003
WO 2008137996 A1 11/2008

OTHER PUBLICATIONS

Ai-Nuuaimi M. K. T. et al., "Novel Planar AMC for Low Profile Antenna Applications", Antennas & Propagation Conference, 2009. LAPC 2009. Loughborough, IEEE, Piscataway, NJ, Nov. 16, 2009, pp. 145-148.

(Continued)

*Primary Examiner* — Benny Lee
*Assistant Examiner* — Jorge Salazar, Jr.
(74) *Attorney, Agent, or Firm* — Lando & Anastasi, LLP

(57) ABSTRACT

A common communications device comprising an array of near-field coupled resonant elements, the elements each comprising a coupling portion comprising a loop portion with free ends, the device being provided in combination with a data transmission unit and a data reception unit, each unit having a coupling portion, the units being arranged to communicate with one another by means of the coupling portion of each unit and the common communications device, the coupling portion of the data transmission unit comprising a resonant element comprising a loop portion arranged to be near-field coupled to the loop portion of a first resonant element of the device, the coupling portion of the data reception unit comprising a resonant element comprising a loop portion arranged to be near-field coupled to the loop portion of a second resonant element of the device not being the first resonant element.

22 Claims, 14 Drawing Sheets

(52) U.S. Cl.
CPC ........... *H04B5/0081* (2013.01); *B60L 11/1846* (2013.01); *H01P 1/20381* (2013.01); *Y02T 10/7005* (2013.01); *Y02T 10/7072* (2013.01); *Y02T 90/121* (2013.01); *Y02T 90/128* (2013.01); *Y02T 90/14* (2013.01); *Y02T 90/16* (2013.01); *Y02T 90/163* (2013.01); *Y02T 90/169* (2013.01); *Y04S 30/14* (2013.01)

(56) References Cited

U.S. PATENT DOCUMENTS

| 2010/0259108 | A1* | 10/2010 | Giler et al. ............... 307/104 |
| 2012/0306588 | A1 | 12/2012 | Mcculloch et al. |
| 2012/0309316 | A1 | 12/2012 | Edwards et al. |
| 2014/0111290 | A1 | 4/2014 | Stevens |

OTHER PUBLICATIONS

C. Stevens, D. Edwards, "Magneto-inductive Wave Structures for Secure 2D High Data Rate Channels—"Data Cloth"", IET Seminar on Antenna and Propagation for Body-Centric Wireless Communications 2009, Jun. 26, 2009, pp. 1-2.
Freire Manuel et al., "Optimizing the Magnetoinductive Lens: Improvement, Limits, and Possible Applications", Journal of Applied Physics, American Institute of Physics. NY, vol. 103, No. 1, Jan. 15, 2008, pp. 13115-13151.
International Preliminary Report on Patentability and Written Opinion mailed Jun. 21, 2012 for International Application No. PCT/GB2010/052040 filed Dec. 7, 2010, 13 pages.
Radkovskaya A. et al., "An Experimental Study of the Properties of Magnetoinductive Waves in the Presence of Retardation", Journal of Magnetism and Megnetic Materials, Elsevier Science Publishers, Amsterdam, NL, vol. 300, No. 1, May 1, 2006, pp. 29-32.
Radkovskaya A. et al., "Experimental Study of a Bi-Periodic Magnetoinductive Waveguide: Comparison with Theory", Feb. 5, 2007, vol. 1, No. 1, Feb. 5, 2007 pp. 80-83.
Shamonina E. et al., "Magnetoinductive Waves in One, Two and Thee Dimensions", Journal of Applied Physics, American Institute of Physics. NY, vol. 92, No. 10, Nov. 15, 2002, pp. 6252-6261.
Shamonina E. et al., "Properties of Magnetically Coupled Metamaterial Elements", Journal of Magnetism and Magnetic Materials, Amsterdam, NL, vol. 300, No. 1, May 1, 2006, pp. 38-43.
Sydoruk O. et al., "Mechanism of Subwavelength Imaging with Bilayered Magnetic Metamaterials: Theory and Experiment", Journal of Applied Physics, American Institute of Physics. NY, vol. 101, No. 7, Apr. 3, 2007, pp. 73903-073903.
Ying Huang et al., "Design of a Low Profile End-Fire Antenna Using Split-Ring Resonators", Antennas and Propagation Society International Symposium, 2008. AP-S 2008. IEEE, IEEE, Piscataway, NJ, Jul. 5, 2008, pp. 1-4.
Sun, Zhi, et al., "Underground Wireless Communication using Magnetic Induction", School of Electrical & Computer Engineering, Georgia Institute of technology, 2009, 5 Pages.
M. Beruete et al., "Electroinductive Waves in Chains of Complementary Metamaterial Elements", Applied Physics Letters, 2006, 4 Pages.
Third Office Action mailed Apr. 3, 2015 in corresponding Chinese Applicaiton No. CN2015033101232200, 10 Pages.
Chan, et al., "Two-Dimensional Magneto-Inductive Wave Data Structures", Antennas and Propagation, IEEE, 2011, pp. 1071-7075.
Hao, et al., "Comparison of Simulation and Measurement for 1-D Metamaterial Devices", Proceedings of SPIE—The International Society for Optical Engineering, 2005.
Hao, et al., "Numerical and Experimental Studies of Resonators with Reduced Resonant Frequencies and Small Electrical Sizes", Department of Engineering Science, University of Oxford, 2008, pp. 1-3.
Hao, et al., "Optimisation of Metamaterials by Q Factor", Electronics Letters, vol. 41, No. 11, 2005, pp. 653-654.
Hao, et al., "Reducing Electrical Size of Metamaterial Elements: Simulations and Experiments", Electronics Letters, vol. 44, No. 14, 2008, pp. 864-865.
Hesmer, et al., "Coupling Mechanisms for Split Ring Resonators: Theory and Experiment", Physica Status Solidi, vol. 244, No. 4, 2007, pp. 1170-1175.
Li, et al., "Capacitor Connected Grids for Wireless Power Transfer", Wireless Power Transfer Conference, IEEE, 2014, pp. 122-125.
Li, et al., "Capacitor-Connected Grids As One-Dimensional UWB Data Transfer Channels", Advanced Electromagnetic Materials in Microwaves and Optics (METAMATERIALS), IEEE, 2013, pp. 19-21.
Li, et al., "Dispersion Characteristics of Two-Dimensional Capacitor-Connected Grids", Advanced Electromagnetic Materials in Microwaves and Optics (METAMATERIALS), IEEE, 2012, pp. 337-339.
Li, et al., "Two-Dimensional Capacitor-Connected Grids Metamaterial Waveguide for UWB Contactless Data Transfer Channels", Electromagnetics in Advanced Applications, IEEE, 2013, pp. 1437-1441.
Maekawa, "Wireless Transmission Second Act, "Resonance-Type" Whether Favorite", EE Times Japan, pp. 1-43, Date: Oct. 2009.
Radkovskaya, et al., "Dimer and Polymer Metamaterials with Both Electric and Magnetic Coupling", Physical Review B 84, 2011, pp. 1-6.
Radkovskaya, et al., "Resonant Frequencies of a Combination of Split Rings: Experimental, Analytical and Numerical Study", Microwave and Optical Technology Letters, vol. 46, No. 5, 2005, pp. 473-476.
Radkovskaya, et al., "Surface Waves at an Interface of Two Metamaterial Structures with Interelement Coupling", Physical Review B, vol. 82, No. 4, 2010, pp. 1-9.
Radkovskaya, et al., "Waves on Coupled Lines of Resonant Metamaterial Elements: Theory and Experiments", Progress in Electromagnetics Research Symposium 2006, p. 448.
Stevens et al., "Forward Magneto-Inductive Wave Propagation in Planar Magnetically Coupled Capacitor Grids", Journal of Electromagnetic Waves and Applications, vol. 29, No. 6, pp. 753-762, 2015.
Stevens, "A Magneto-Inductive Wave Wireless Power Transfer Device", Wireless Power Transfer, vol. 2, No. 01, pp. 51-59, 2015.
Stevens, "Power Transfer Via Metamaterials", Computers, Materials & Continua, vol. 33, No. 1, 2013, pp. 1-8.
Stevens, et al., "Magnetic Metamaterials as 1-D Data Transfer Channels: An Application for Magneto-Inductive Waves", Microwave Theory and Techniques, IEEE, vol. 58, No. 5, 2010, pp. 1248-1256.
Sydoruk, et al., "Tailoring the Near-Field Guiding Properties of Magnetic Metamaterials with Two Resonant Elements Per Unit Cell", Physical Review, vol. 73, No. 22, 2006, pp. 1-12.
Wiltshire, et al., "Metamaterial Endoscope for Magnetic Field Transfer: Near Field Imaging with Magnetic Wires", Optics Express, vol. 11, No. 7, pp. 709-715, Date:Apr. 2003.
Zhu et al., "Investigation of Vertical Spiral Resonators for Low Frequency Metamaterial Design", Department of Engineering Science, University of Oxford, 2008.
Zhu, et al., "Optimal Design of Miniaturized Thin-Film Helical Resonators", Applied Physics Letters, vol. 93, No. 23, 2008, pp. 1-4.

* cited by examiner

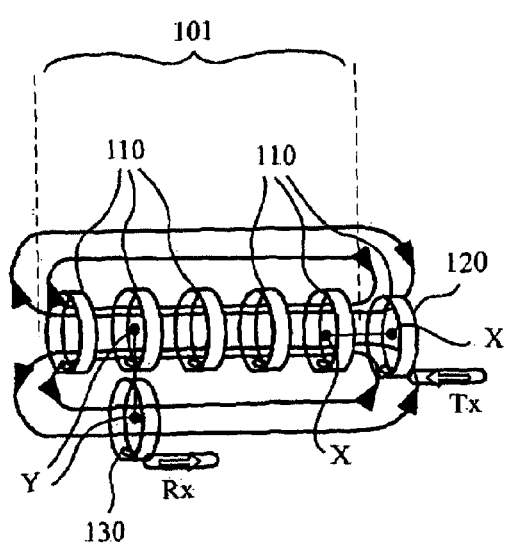
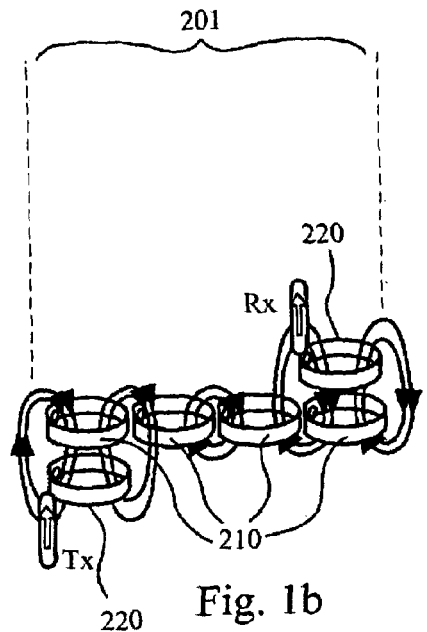
Fig. 1a
Fig. 1b
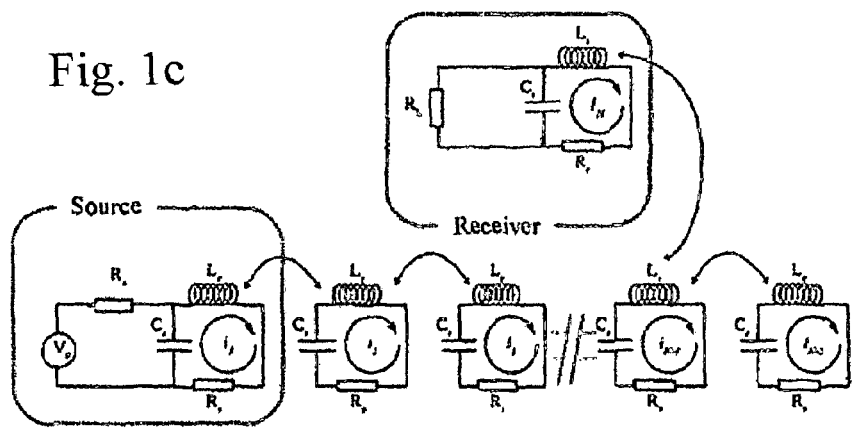
Fig. 1c
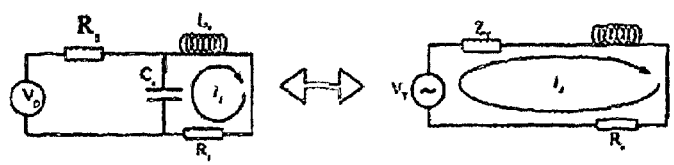
Fig. 1d

COMMON COMMUNICATIONS DEVICE

Application claims priority to foreign patent application PCT/GB2010/052040 filed on Dec. 10, 2010.

FIELD OF THE INVENTION

The present invention relates to communications devices. In particular the invention relates to a common communications device by means of which data may be transmitted between electronic devices.

BACKGROUND

Data connections between electronic devices are typically made by means of cables or by wireless radio communications devices. Computing devices typically connect with associated accessories and peripherals such as printers, digital cameras, external hard drives and flash drives by Universal Serial Bus (USB) or similar cable interfaces. Wireless communications devices are also common. Microprocessors are generally connected to associated components via multiconductor bus lines defined as tracks on a printed circuit board (PCB) or similar.

A problem associated with cable connections is that they present a trip hazard as well as a potential electrical shock hazard. Thus, cable management systems are typically required. Such systems are particularly important in the workplace and public access areas where health and safety legislation must be complied with. Cable connections are also potentially clumsy and require manual manipulation of a connector fitted to the cable in order to effect a connection. This can be a problem for physically challenged individuals. Repeated connection and disconnection limits the lifespan of connectors due to wear.

STATEMENT OF THE INVENTION

In a first aspect of the present invention there is provided a common communications device comprising an array of near-field coupled resonant elements, the elements each comprising a coupling portion comprising a loop portion,
the device being provided in combination with a data transmission unit and a data reception unit, each unit having a coupling portion, the units being arranged to communicate with one another by means of the coupling portion of each unit and the resonant elements of the common communications device,
the coupling portion of the data transmission unit comprising a resonant element comprising a loop portion arranged to be near-field coupled to the loop portion of a first resonant element of the device, the coupling portion of the data reception unit comprising a resonant element comprising a loop portion arranged to be near-field coupled to the loop portion of a second resonant element of the device not being the first resonant element.

The loop portion may have free ends. The free ends may form a capacitive gap, or the free ends may be connected by a capacitor. According to these arrangements the loop portion does not form a closed loop, and has a capacitive gap between the free ends.

The resonant element may include more than one loop portion. For example, resonant element may include two concentric loop portions that are not conductively connected to each other.

Embodiments of the invention have the advantage that input and output devices may be coupled to one another by means of a common communications device at substantially any position of the device. Furthermore, more than two devices can be coupled to the device without a requirement to provide connectors and associated switching electronics.

Embodiments of the present invention comprise one or more arrays of magnetically coupled resonant circuits which are sometimes known as synthetic magnetic plasmas or metamagnets. Some embodiments comprise one or more arrays of resonant circuits coupled by means of an electric field instead of a magnetic field.

In the former case, an array of magnetically coupled resonators is capable of supporting a propagating electromagnetic wave whose principle components are currents circulating in each circuit and their shared magnetic flux. Such waves have become known as magneto-inductive (MI) waves (see e.g. E. Shamonina, V. E. Kalinin, K. H. Ringhofer and L. Solymar, 'Magneto-inductive waveguide', Electron. Letters 38, 371-3 (2002)).

MI waves only propagate in regions where there are resonant circuits. In a two-dimensional structure the waves therefore decay as $1/r$ in power rather than $1/r^2$ in the case of a three-dimensional structure.

The present invention takes advantage of the fact that the MI waves' local magnetic flux can couple to external devices placed next to the structure supporting the MI waves but only in the near field, close to the structure.

Provided a radius r of resonators of an array are generally small compared with the free space wavelength $\lambda$, radiation losses $R_{rad}$ are not significant:

$$R_{rad} \propto \left(\frac{r}{\lambda}\right)^4$$

This has the advantage that devices exploiting MI waves in the near-field regime may be arranged not to emit electromagnetic radiation in the far-field regime, thereby eliminating a requirement for licensing considerations in respect of electromagnetic spectrum transmission bands. Furthermore, shielding may be added if desired, although it is envisaged to be unnecessary in most implementations.

Furthermore, bandwidth can be increased by raising the frequency of operation, the limit to frequency of operation being set by fabrication issues and the complex conductivity of metallic conductors used (of the order of 100 s of GHz).

Arrays of coupled resonators supporting MI waves (or corresponding resonators coupled to one another by means of electric field flux lines as opposed to magnetic field flux lines) are similar to 'metamaterials' since they behave as continuous media on free space wavelength scales despite being formed from arrays of discrete coupled elements by which their apparent bulk properties may be engineered.

Optionally, a first pair of adjacent resonant elements by means of which the data transmission unit and data reception unit are coupled are coupled at least partially in an axial configuration and a second pair of adjacent resonant elements by means of which the data transmission unit and data reception unit are coupled are coupled at least partially in a planar configuration.

At least a pair of resonant elements of the device may be coupled to one another in a substantially planar coupled configuration.

Thus, some loop elements may be provided adjacent to one another in substantially the same plane.

At least a pair of resonant elements of the device may be coupled to one another in a substantially coaxial configuration.

The device may have a free surface arranged to allow a data transmission or data reception unit to be placed in abutment therewith thereby to effect near-field coupling between the unit and resonant elements of the device.

For example, the resonant elements may be embedded in a host medium such as a sheet of a plastics material, optionally a flexible sheet of plastics material.

It is to be understood that the free surface may be a flat, planar surface, a curved surface, or any other suitable surface.

A plane of each respective loop of the resonant elements of the device may be arranged to be substantially parallel to a portion of the free surface local to the respective loop.

By local is meant a portion of the free surface closest to the respective loop.

Alternatively a plane of each respective loop of the resonant elements of the device may be provided substantially normal to a portion of the free surface local to the respective loop.

A plane of each respective loop of the resonant elements of the device may be provided at an angle in the range from around 30° to around 70°, preferably around 45° to the portion of the free surface local to the respective loop.

Respective adjacent pairs of resonant elements may be arranged such that their respective loop portions are tilted in opposite directions about an axis lying in a plane of each loop portion, respective axes being substantially parallel to one another.

Respective adjacent pairs of elements may be oriented substantially normal to one another.

The device may comprise first and second layers of resonant elements.

A plane of each respective loop of resonant elements of the first layer may be substantially parallel to a plane of each respective loop of resonant elements of the second layer.

Alternatively a plane of each respective loop of resonant elements of the first layer may be substantially normal to a plane of each respective loop of resonant elements of the second layer.

The device may comprise a third layer of resonant elements, the first and third layers being arranged to sandwich the second layer therebetween.

Each respective loop of resonant elements of the third layer may be parallel to a corresponding loop of a resonant element of the first layer being a resonant element above each respective loop of the third layer.

Resonant elements of the first layer of may have a different resonant frequency to resonant elements of the second layer.

The resonant frequency of the coupling element of the data transmission unit or data reception unit may be different from the resonant frequency of the resonant elements of the first and second layers.

The presence of a coupling portion of a data transmission unit or data reception unit in a suitable orientation above the first layer of resonant elements may be arranged to cause a shift in a resonant frequency of one or more resonant elements of the first layer whereby a resonant element of the second layer and the coupling element of the data transmission unit or data reception unit become coupled.

This has the advantage that an ease with which an unauthorised party may couple a resonant element to the device may be reduced.

A resonant element of the device may be arranged to become disabled whereby the resonant element is no longer coupled to one or more adjacent resonant elements in the event that a magnitude of a current flowing in the loop portion of the resonant element exceeds a prescribed value.

This has the advantage that in some cases if an unauthorised party seeks to couple a resonant element to the device the device may be caused to become disabled. The device may be arranged to be caused to become permanently disabled (a one-shot arrangement). Alternatively the device may be arranged to be caused to become reversibly disabled.

A resonant element of the first layer of the device may be arranged to become disabled in the event that a magnitude of a current flowing in the loop portion thereof exceeds a prescribed value.

The device may further comprise a third layer of resonant elements, the first and third layers being arranged to sandwich the second layer therebetween.

The first and third layers may be arranged to enhance a coupling of a transmitted signal through the structure.

Respective planes of loop portions of coupling elements of the first and third layers may be substantially parallel.

Respective planes of loop portions of coupling elements of the first and third layers may be substantially normal to corresponding planes of loop portions of the second layer.

The data transmission unit and the data reception unit may be arranged to communicate with one another by means of magneto-inductive (MI) waves.

Alternatively or in addition the data transmission unit and the data reception unit may be arranged to communicate with one another by means of electro-inductive (EI) waves.

The resonant elements of the common communications device may be provided on or within a substrate.

The substrate may comprise one selected from amongst a plastics material and a fabric.

The substrate may be a flexible substrate.

In a second aspect of the invention there is provided an article comprising a common communications device according to the first aspect.

The article may be one selected from amongst an article of clothing, a piece of carpet, a piece of wallpaper, a construction panel, a fluid conduit, a circuit board, a mother board and an integrated circuit.

In a third aspect of the invention there is provided transportation apparatus having a common communications device according to the first aspect of the invention provided on or in a portion of a structure thereof.

Preferably the structure is one selected from amongst a hull of a vessel, a fuselage of an aircraft, a body of a motor vehicle and a cab of a motor vehicle.

BRIEF DESCRIPTION OF THE DRAWINGS

Embodiments of the invention will now be described with reference to the accompanying figures in which.

DETAILED DESCRIPTION

Figure 1E:
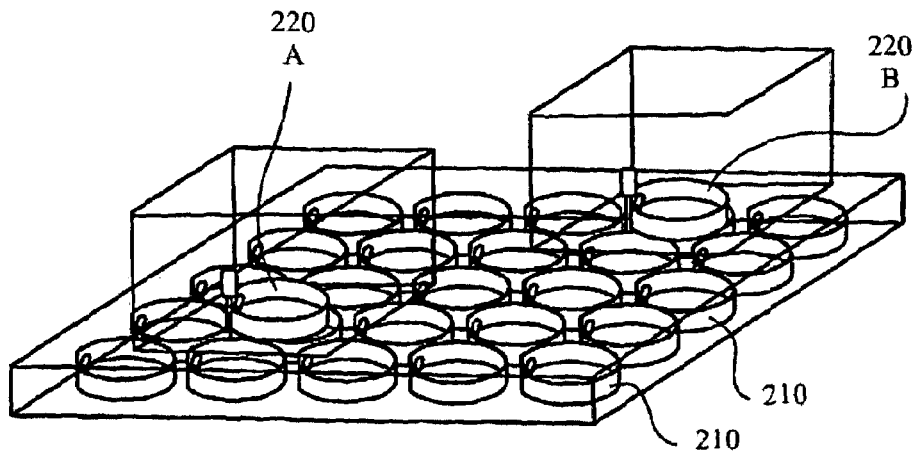
FIG. 1 shows (a) an array of axially-coupled resonant circuits; (b) a 1-D array of plane-coupled resonant circuits providing a common communications device (or 'channel') according to an embodiment of the invention; (c) an equivalent circuit for the arrangement shown in (b); (d) schematic illustration of an equivalence between a cable coupled resonant circuit (or 'particle' or 'element') and a Thevenin source with a complex source and internal impedance used to describe the full transfer of power through a device according to an embodiment of the invention and (e) a 2-D array of plane-coupled resonator circuits providing a device according to an embodiment of the invention.

FIG. 1 shows (a) an array 101 of axially-coupled resonant circuits 110 and (b) an array 201 of plane-coupled resonant circuits 210 providing a common communications device (or channel) according to an embodiment of the invention. The circuits 110, 210 are arranged to be coupled together by means of magnetic flux generated by electric currents induced in loop portions of respective circuits 110, 210.

In FIG. 1(a) a resonant circuit 120 of a transmitter unit is shown axially-coupled to the array 101 of resonant circuits 110 whilst a resonant circuit 130 of a receiver unit is shown plane-coupled to the array 101.

By axial coupling between a pair of resonant circuits is meant that a nominal line connecting a centre of each loop of the pair of resonant circuits has at least a non-negligible component parallel to a normal to a plane of the loop as shown in the case of line X-X of FIG. 1(a).

By plane or planar coupling between a pair of resonant circuits is meant that a nominal line connecting a centre of each loop of the pair has at least a non-negligible component parallel to a plane of each loop as shown also in FIG. 1(a).

It is to be understood that the arrangement of FIG. 1(a) may correspond to a receiver unit positioned below a structure having the array 101 incorporated therein and a transmitter unit positioned at an end of the structure.

In FIG. 1(b) a resonant circuit 220 of a transmitter unit is shown axially-coupled to the array 201 of resonant circuits 210 and a resonant circuit 230 of a receiver unit is also shown axially-coupled to the array 201.

It is to be understood that the arrangement of FIG. 1(b) may correspond to a receiver unit positioned below a structure having the array 201 incorporated therein and a transmitter unit positioned above the structure.

It is to be understood that throughout the specification reference to 'above' and 'below' is for the purpose of clarity of description with reference to an orientation as illustrated and is not to be interpreted as limiting of the orientation of a device or structure in use.

FIG. 1(c) shows an equivalent circuit used to analyse the arrangement of FIG. 1(b). FIG. 1(d) illustrates the equivalence between a cable coupled resonant element and a Thevenin source with a complex source and internal impedance used to describe the full transfer or power through the device.

FIG. 1(e) illustrates an embodiment in which a transmitter unit having a resonant circuit 220 and a receiver unit a resonant circuit 230 are provided on a common communications device, the device being in the form of a 2D array of resonant circuits 210.

Figure 2:
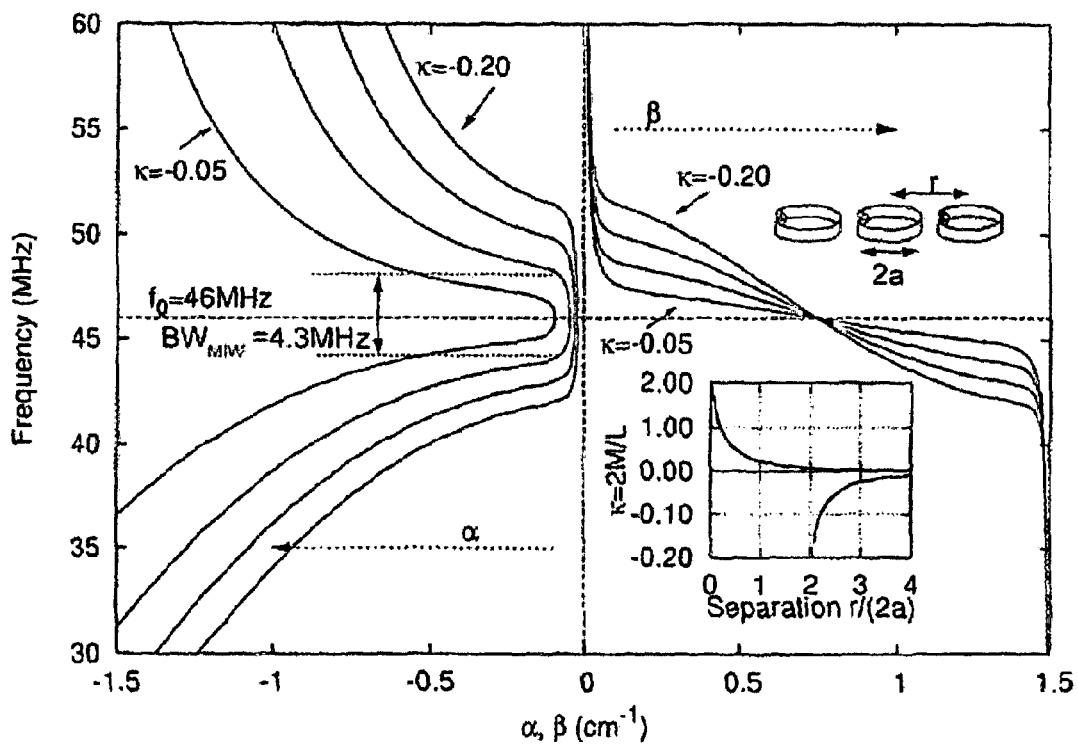
FIG. 2 shows calculated values of attenuation $\alpha$ and wavevector $\beta$ as a function of frequency and in-plane coupling coefficient $\kappa$ for MI waves propagating in the device of FIG. 1(b), with a resonant frequency of 46 MHz and Q=100 with κ=−/0/5, −0.10, −0.15, −0.20.

FIG. 2 shows calculated values of attenuation α and wave-vector β as a function of frequency and in-plane coupling coefficient κ for MI waves propagating in the structure of FIG. 1(b), the structure having a resonant frequency of 46 MHz and a Q of 100.

The negative value of κ results in the propagation of backward waves as indicated by the negative slope of β versus frequency. Variation of the coupling coefficient as a function of separation between resonant particles shows an increasing pass-band in the vicinity of the resonant frequency as κ increases. For an infinite structure, the pass-band (i.e. the region over which the magnitude of α is substantially at a minimum) increases roughly linearly with increasing coupling.

For a finite structure, reflections and standing waves are likely to play a role and the pass-band becomes modulated with discrete peaks.

In some embodiments, devices communicating with one another by means of the common communications device may be arranged to select a frequency of transmission and/or reception of a signal according to one or more characteristics of the common communications device such as a position of one or more peaks of the pass-band.

In some embodiments, ends or edges of the structure may be terminated by a complex impedance or a series of impedances in order to reduce an amount of reflected signal, see e.g. Syms et al, 'Absorbing terminations for magneto-inductive waveguides', IEE Proceedings—Microwaves Antennas and Propagation 152, pp 77-81 (2005).

Figure 3:
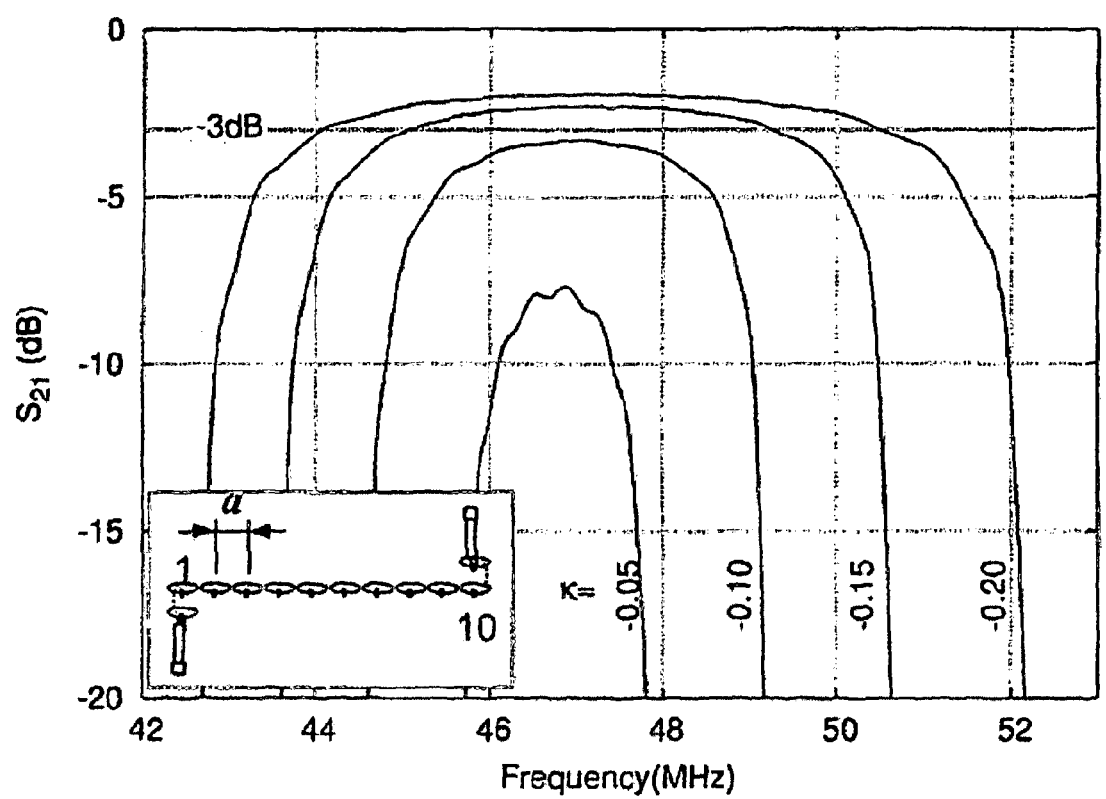
FIG. 3 shows a graph result of calculations of a power transfer function for different values of coupling coefficient for a simple linear set of 20 mm diameter resonant circuits arranged in a row in a coplanar manner.

FIG. 3 shows a result of calculations of a power transfer function for different values of coupling coefficient for a simple linear set of 20 mm diameter resonant particles arranged in a row in a coplanar manner. Centres of the particles are arranged to be spaced by a distance 'a'.

For the purpose of the calculations each particle was considered to consist of a single circular broken loop of conductor (forming an inductance of 43 nH) with a capacitor (having a capacitance of 270 pF) connected across it.

Signals were coupled into a first element of the row by a further resonant particle coupled to signal-fed input cable. Signals were coupled from an element of the row at an opposite end of the row to the last element of the row by a further resonant particle coupled to an output cable. This calculation used a set of 10 resonant coplanar particles, as shown in the inset.

The inter-particle coupling coefficient κ was varied between −0.05 (a=2.5 cm) and −0.2 (a=2.007 cm, i.e. particles virtually in contact). It can be seen that for weak inter-resonator coupling the transfer function is small with low bandwidth. As coupling strength is increased the transfer function and bandwidth are found to rise.

Figure 4:
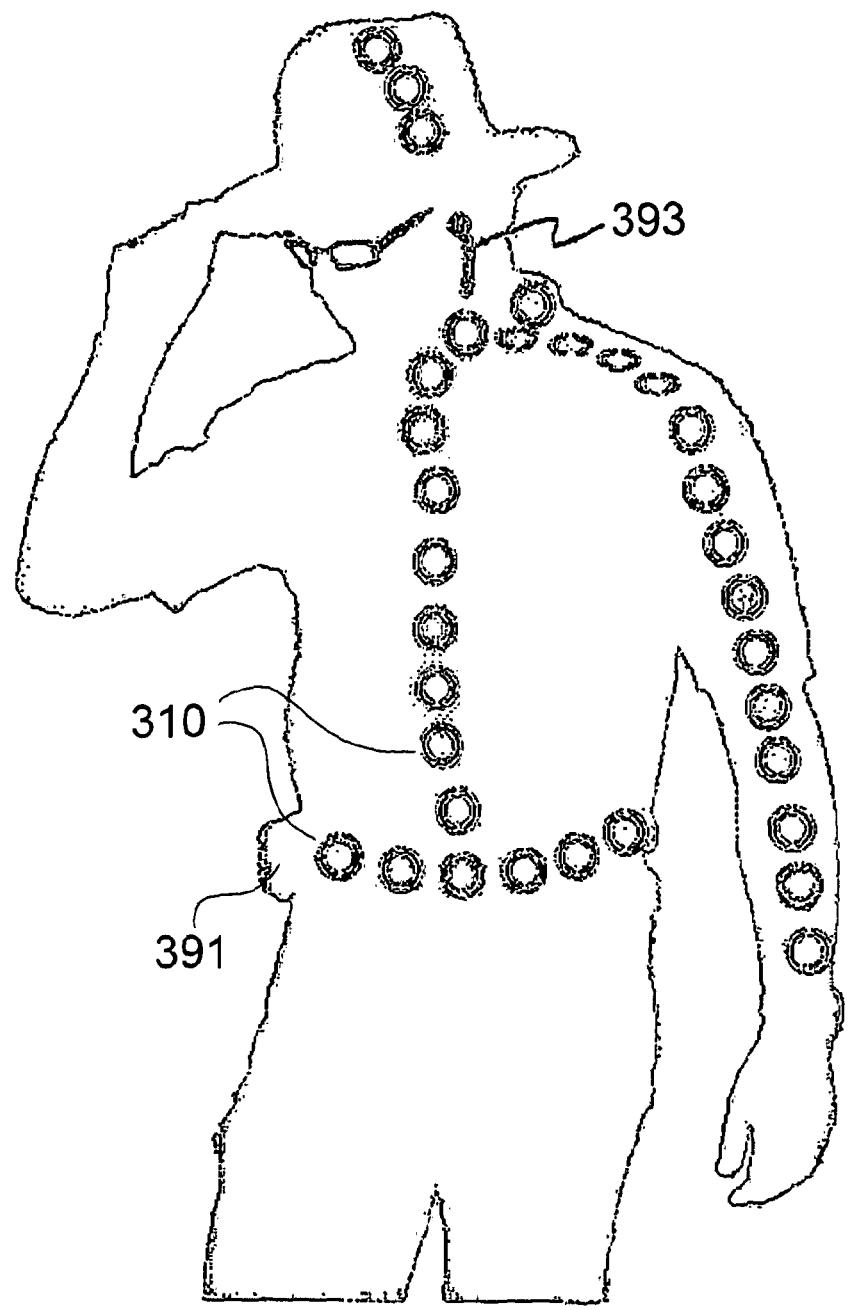
FIG. 4 shows an embodiment in which a linear array of resonant circuits are coupled providing a data channel on the surface of a human body.

FIG. 4 shows an embodiment of the invention in which a linear array of resonant circuits (or 'resonators') 310 are coupled to a person's body. In some embodiments the circuits 310 are embedded in or otherwise coupled to one or more articles of clothing.

The array of circuits 310 provides a body network allowing devices coupled to or in close proximity to the body of a user to communicate with one another wirelessly. In the embodiment shown in FIG. 4 a mobile telephone device 391 is provided in electrical communication with a headset 393 by means of the array of circuits 310, the resonant circuits being substantially planar-coupled to one another. Systems, such as Bluetooth, that are currently used for wireless communication between devices, suffer from limited capacity in crowded locations. The arrangement shown in FIG. 4 allows the use of non-radiative local data transfer channels, which provide enhanced security and avoid the problems of limited capacity in crowded locations.

Figure 5A:
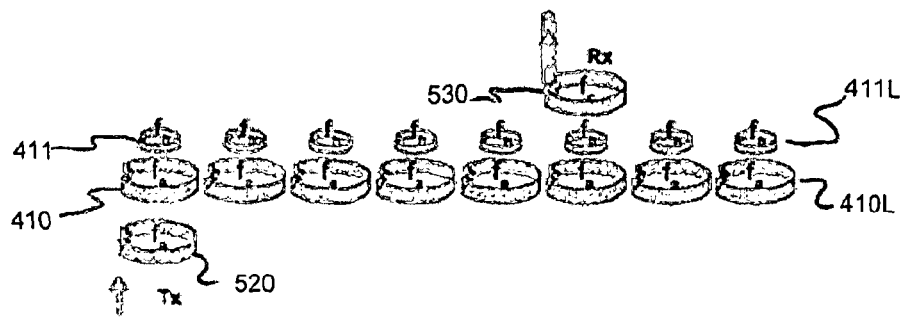
FIG. 5 shows (a) a further embodiment in which two layers of resonant circuits are provided and (b) a corresponding plot of S21 as a function of frequency.

A further embodiment of the invention is shown in FIG. 5(a). In the embodiment of FIG. 5(a) two layers of resonators are provided. Resonators 410 of one layer being a transmission layer 410L are planar coupled and arranged to support propagation of MI waves along a line or plane defined by the resonators 410. Resonant circuits 411 of another layer being an interface layer 411L above the transmission layer 410L are also planar coupled and arranged to facilitate coupling of the resonators of the transmission layer 410L to a resonator 520, 530 of a transmitter or receiver unit.

It is to be understood that resonant circuits 411 of the interface layer 411L are less strongly coupled to one another than resonators 410 of the transmission layer 410L. This is at least in part because resonators of the interface layer 411L are smaller than those of the transmission layer 410L such that there is a greater distance between resonators of the interface layer 411L.

A resonant frequency of resonators 411 of the interface layer 411L is arranged to be out of the MI wave pass-band of the transmission layer 410L such that substantially no coupling of power out from the transmission layer 410L to the interface layer 411L occurs in the absence of a coupler of a suitable transmission or reception unit.

Figure 5B:
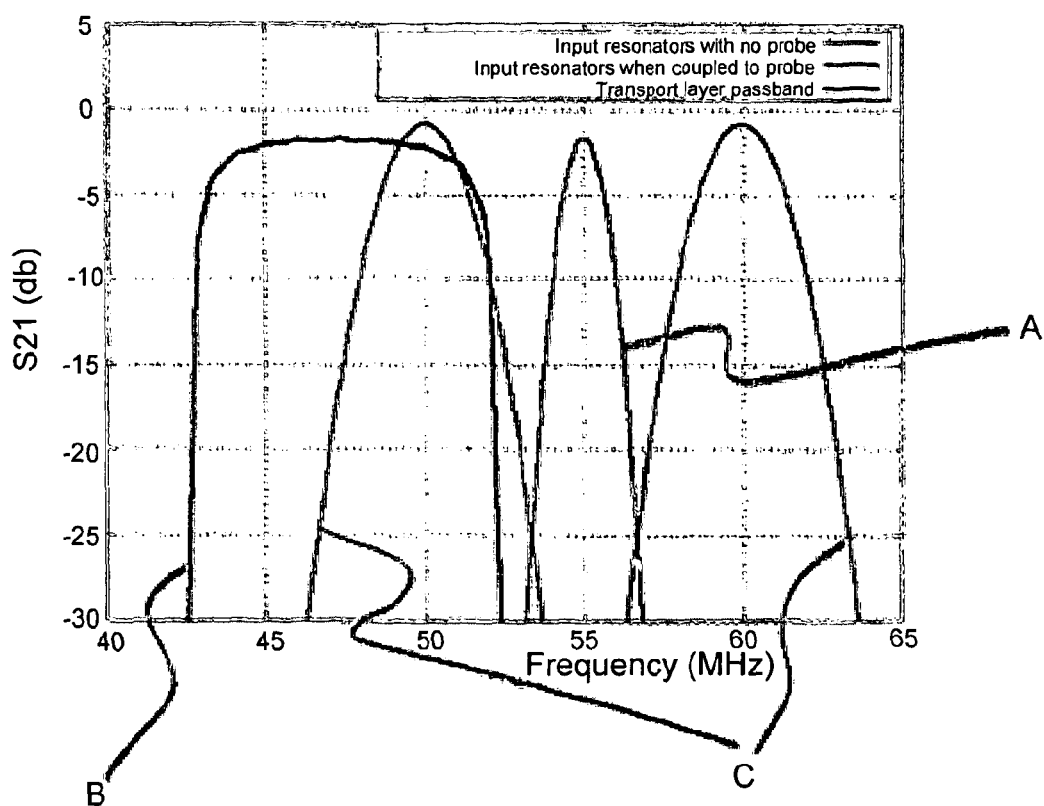

This arrangement is illustrated by the plots shown in FIG. 5(b) where a value of S21 (dB) is plotted as a function of frequency. Trace A corresponds to a pass-band of resonators of the interface layer 411L in the absence of an external coupler 520, 530 such as a coupler of a receiver unit or a transmitter unit, whilst trace C corresponds to a pass-band of resonators of the transmission layer 410L. Trace B corresponds to a pass-band of resonators of the transmission layer 410L.

If a coupler of a suitable transmission or reception unit 520, 530 is present in the vicinity of the interface layer 411L, coupling between the coupler of the unit and the interface layer 411L is arranged to occur. This is because the presence of the coupler of the transmission or reception unit 520, 530 results in a shifting of the pass-band of the interface layer 411L such that overlap of the pass-bands of the interface layer 411L and transmission layer 410L occurs.

This is illustrated in FIG. 5(b) where trace C shows a splitting or the pass-band of the interface layer 411L whereby two discrete pass-bands labelled C can now be identified. Thus, the pass-band of the interface layer 411L is shifted into the transmission layer 410L MI wave pass-band range (illustrated by trace B).

It is to be understood that under such circumstances the coupler of a unit can inject signals into the transmission layer 410L but the resulting MI wave cannot couple back to the interface layer 411 unless a suitable coupler (such as that of another suitable transmission or receiver unit) is present in the vicinity of the interface layer 411L.

Embodiments of the invention having this feature have the advantage that power is only transmitted to the interface layer 411L at locations where a coupler of a suitable transmitter or receiver device is located thereby reducing an amount of power lost from an MI wave propagating in the transmission layer 410L.

Figure 6:
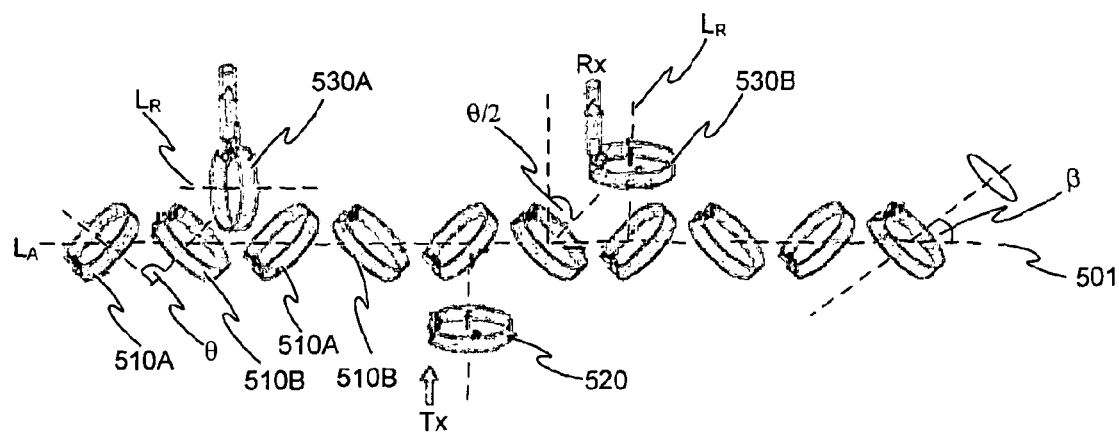
FIG. 6 shows an embodiment in which resonant circuits of a linear array are oriented in a non-coplanar, corrugated manner to minimise constraints on coupling geometry.

FIG. 6 shows an embodiment in which resonant circuits 510A, 510B of a linear array 501 are oriented in a non-coplanar, corrugated manner whereby a plane of a loop portion of each of respective pairs of adjacent resonant circuits 510A, 510B are inclined at an angle θ with respect to one another. In the embodiment shown θ is substantially 90°. Other values of θ are also useful such as 45° or any other suitable value. Some values of θ may provide an increased data capacity with respect to other values. In the example of FIG. 6 the resonant circuits 510A, 510B are tilted at 45 degrees to the alignment of the linear array.

It is to be understood that the embodiment of FIG. 6 allows resonant circuits having loop portions oriented at a range of different angles to couple to the array 501. For example, a loop portion 530A of a receiver may be oriented such that a longitudinal axis $L_R$ of the loop portion 530A is substantially parallel to a longitudinal axis $L_A$ of the array 501. Alternatively, a longitudinal axis $L_R$ of a loop portion 530B of a receiver may be oriented substantially normal to a longitudinal axis $L_A$ of the array 501.

As a further alternative, a longitudinal axis $L_R$ of a loop portion of a receiver or longitudinal axis $L_T$ of a loop portion of a transmitter may be oriented at an angle β with respect to $L_A$ other than 0° or 90° in order to give increased coupling efficiency between the loop portion and the array 501.

It is to be understood that linear arrays described herein may be extended to form two dimensional arrays, for example by providing multiple linear arrays in a side-by-side configuration.

Figure 7:
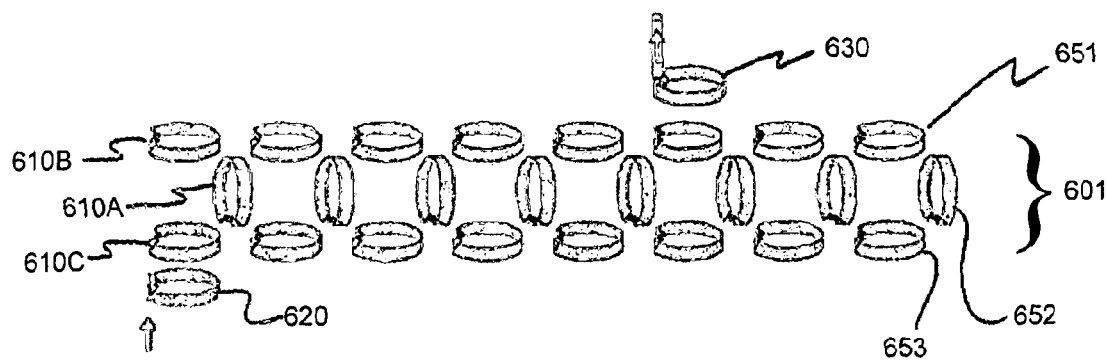
FIG. 7 shows an array of resonant circuits having three layers of resonant circuits.

FIG. 7 shows an array of resonant circuits having three layers 651, 652, 653 of resonant circuits. Each layer comprises a sub-array of resonant circuits 610A, 610B, 610C respectively.

It is to be understood that top and bottom layers 651, 653 are arranged to enhance a coupling between resonant circuits 620, 630 of transmitter and receiver units, respectively, by virtue of their strong interaction with the middle layer 652 as described above with respect to FIG. 5. Coupling between the resonant circuits in the top and bottom layers 651, 653 is enhanced by their strong interaction with the middle layer 652.

A bandwidth of the arrangement may be increased by up to at least around a factor of two by virtue of the enhanced coupling described above.

The arrangement of FIG. 7 could also be used in a two-dimensional array, in which each layer is a two-dimensional array of resonant circuits.

It is to be understood that physically flexible devices such as that shown in FIG. 4 can be fabricated in a relatively simple manner. In some cases the coupling performance may vary when the inter-resonator geometry changes. In some embodiments, the resonators are sufficiently small that the angle between individual resonators in the chain is sufficiently small that coupling performance is maintained, In particular, over the expected range of deformation of the substrate.

Devices can be fabricated in substantially any planar non-conducting surface, including LCD screens, clothing, medical implanted devices, surfaces of vehicles and boats including a hull of a boat, ships, submersibles, PC and laptop cases, printed circuit boards, books, advertising posters and any other suitable non-conducting surface. Thus for example devices may be provided on a PCB to replace bus lines used to communicate data between integrated circuits coupled to the PCB.

In some embodiments a common communications device is provided that is arranged to allow a user to touch a communications or storage device such as a mobile phone, music player and/or video player against a portion of the common communications device to download data. For example, a user may touch a mobile device against a poster at a cinema and download a movie trailer corresponding to the poster.

Other applications are also possible.

Figure 8A:
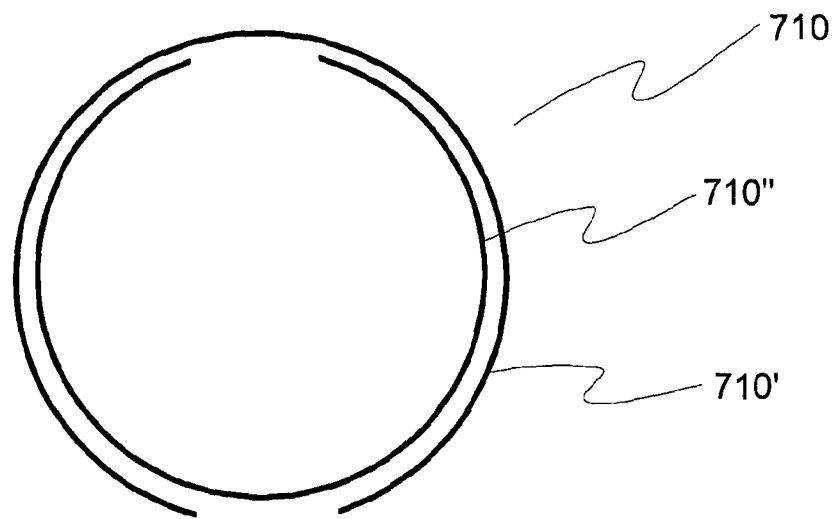
FIGS. 8(a) and 8(b) shows examples of resonant circuits suitable for use in embodiments of the invention.
Figure 8B:
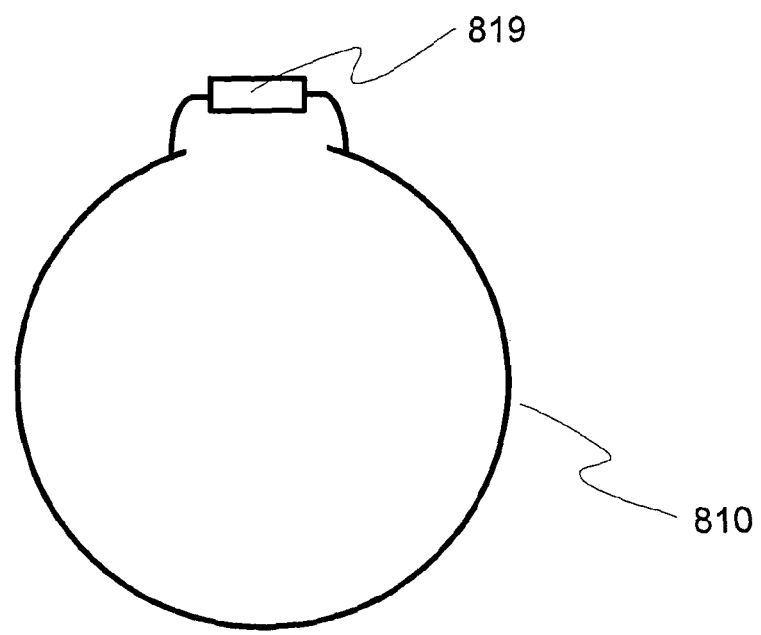

FIGS. 8(*a*) and 8(*b*) shows examples of resonant circuits according to embodiments of the invention. FIG. 8(*a*) shows a resonant circuit 710 having a pair of concentric split ring resonators 710', 710". The split ring resonators 710', 710" are each in the form of a discontinuous ring element having a pair of free ends defining a gap. In some embodiments the gap is an air gap. In some embodiments a medium other than air is provided between the free ends. In the embodiment of FIG. 8(*a*) the respective gaps of the resonators are oriented at 180° with respect to one another.

Preferably, the split ring resonators inherently possess desired inductance, capacitance and resistance values by means of their shape and conductor configuration. This facilitates production of cheap, printable resonant elements that do not require other components to achieve suitable values of inductance, capacitance and resistance. In some arrangements the entire resonator is a two-dimensional structure that does not include any bridging connections that require a third dimension to bridge portions of the resonator. This simplifies production.

In the embodiment of FIG. 8(*b*) a resonant circuit 810 is provided having a single split ring, free ends of the ring being connected by means of a capacitor 819.

It is noted that the ends are considered to be free as there is no conductive path between the ends via the capacitor. The ends would not be free if the capacitor was replaced by a conductive path, effectively replacing the split ring with a continuous ring.

It should be understood that the capacitor need not be connected at the extreme ends of the split ring, it is sufficient if there is a path between the free ends via the capacitor, where the path is defined by one or more conductive portions and a capacitive gap. Although FIGS. 8(*a*) and 8(*b*) illustrate essentially circular split rings, other shapes are possible, such as split square rings, split triangular rings, circular spirals, square and polygonal spirals. The coupling efficiency may depend on the packing configuration, and Polygons have a greater fill factor than circles, allowing polygonal resonant circuits to have stronger coupling between neighbours.

Figure 9:
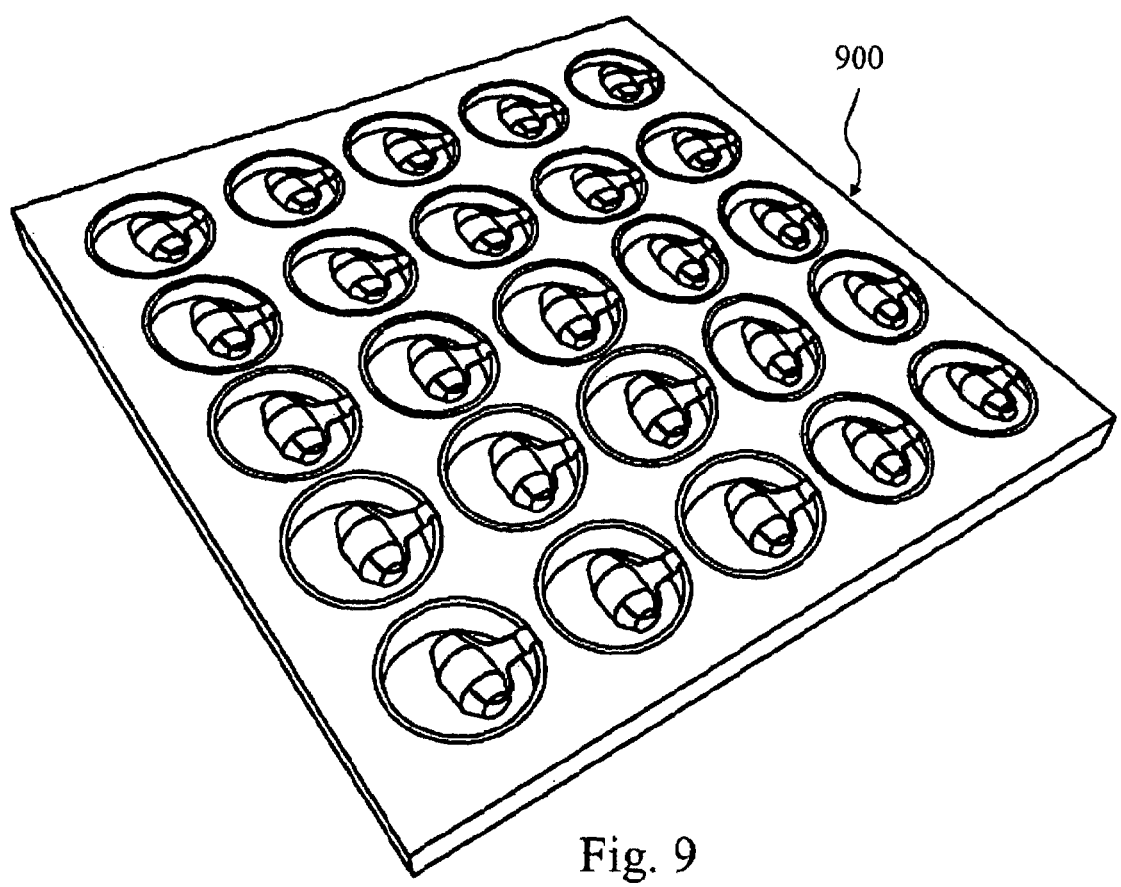
FIG. 9 shows a common communications device having a 2D array of resonant circuits according to the embodiment of FIG. 8(b)

FIG. 9 shows a common communications device 900 having a two-dimensional array of resonant circuits according to the embodiment of FIG. 8(*b*).

Figure 10:
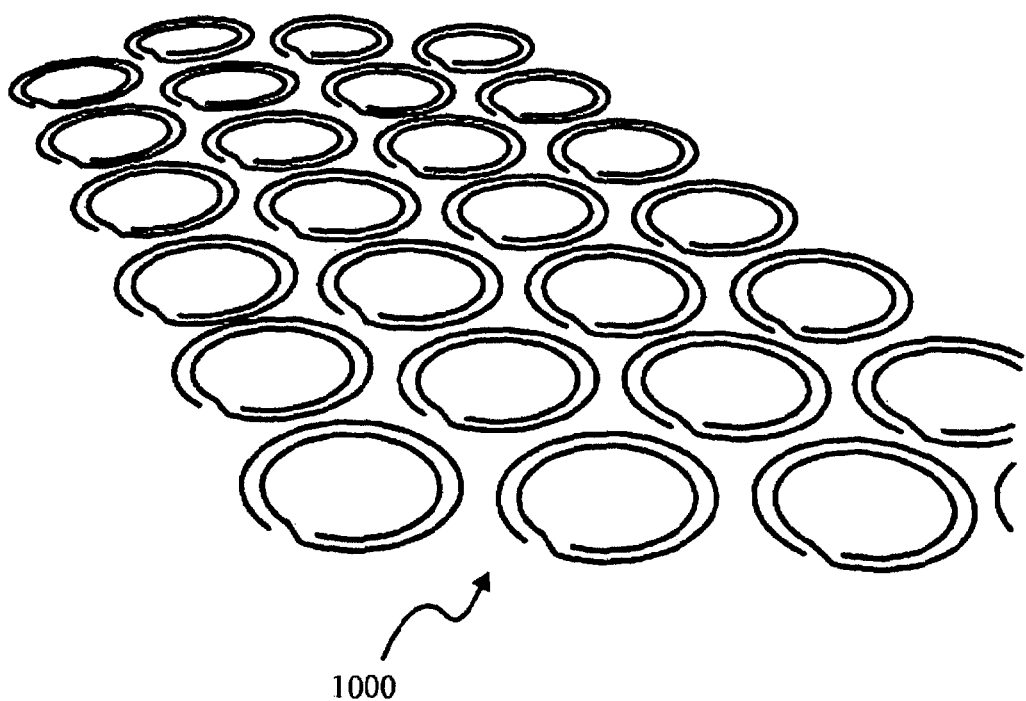
FIG. 10 shows a common communications device according to an embodiment of the invention having a 2D array of resonant circuits of split ring type.

FIG. 10 shows a common communications device 1000 having a two-dimensional array of resonant circuits each resonant circuit being in the form of a spiral split ring resonator.

Figure 11:
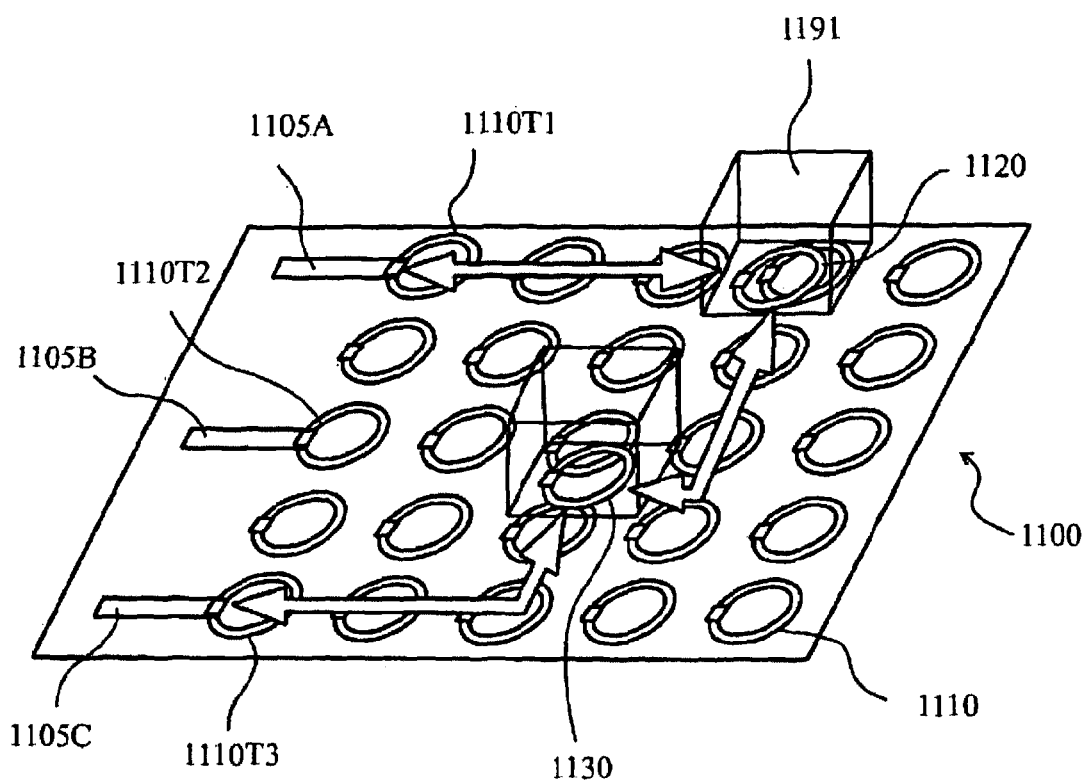
FIG. 11 shows a common communications device according to an embodiment of the invention having a 2D array of resonant circuits provided on a substrate, alternate rows of circuits being coupled to respective input signal lines provided at an end of the rows.

FIG. 11 shows a common communications device 1100 having a two-dimensional array of resonant circuits 1110. The circuits 1110 are arranged in rows and columns.

In the embodiment shown an end resonant circuit 1110T1, 1110T2, 1110T3 of alternate rows of resonant circuits 1110 is coupled to a corresponding connector 1105A, 1105B, 1105C allowing a signal to be coupled to the respective end resonant circuits 1110T1, 1110T2, 1110T3 and thereby to resonant circuits 1110 of the device 1100.

FIG. 11 also shows first and second portable devices 1191, 1192 respectively arranged to communicate with one another via the common communications device 1100.

The first portable device 1191 has a coupler 1120 having a loop portion arranged to be oriented parallel to a plane of loop portions of resonant circuits 1110 of the common communications device 1100. Similarly, the second portable device 1192 has a coupler 1130 having a loop portion arranged to be oriented parallel to a plane of loop portions of resonant circuits 1110 of the common communications device 1100.

The first and second portable devices 1191, 1192 can therefore communicate with one another via their respective couplers 1120, 1130 and resonant circuits 1110 of the common communications device 1100.

Similarly, the first and second portable devices 1191, 1192 can communicate with devices that are coupled to the connectors 1105A, 1105B, 1105C. In the example given above of a poster allowing download of movie trailers, one or more of connectors 1105A, 1105B, 1105C could be coupled to a server arranged to supply digital video and audio data signals to the device 1100.

It is to be understood that in some embodiments only one connector 1105A is provided. Other numbers of connectors are also useful.

Common communications devices according to embodiments of the invention may be provided in a range of structures such as carpets, carpet tiles, wallpapers, boards for fabricating buildings, on or around cables, pipes, other conduits and any other suitable structure.

An advantage of embodiments of the invention is that power is not required to be supplied to the common communications device in order for it to function. Nor is a controller necessarily required in order to control signals to be transmitted along a common communications device according to embodiments of the invention unless so desired.

It is to be understood that smart devices according to embodiments of the invention may be provided. For example, devices may be arranged to change a range of a pass-band of the common communications device in real time. For example, variable capacitors may be incorporated into the resonant elements of the device. In some embodiments a dielectric constant of a medium may be changed thereby to change the range of the pass-band.

Embodiments of the invention are useful in integrated circuit devices (ICs). Thus, coupling of power and signals to and from the IC or even within the IC may be made by means of MI waves.

Thus, in some embodiments, one or more resonators may be provided on the IC and arranged to couple to one or more corresponding resonators provided on a circuit board or other substrate to which the IC is attached or otherwise provided in proximity with. Power may thereby be transferred to the IC and data signals, control signals and any other required signals transmitted between the IC and substrate. Components of a computing device incorporating such a substrate may be arranged to communicate with one another using the common communications device. For example, storage devices, random access memory devices, graphics processor devices and any other devices or circuits may be arranged to communicate by means of the common communications device. This has the advantage of eliminating a requirement for expensive and delicate mechanical connectors for mounting components to a PCB.

Resonant elements may be provided having substantially circular loop portions. Other shapes of loop portion are also useful including square, rectangular, elliptical and any other suitable shape. Square or rectangular loops have an advantage over some other shapes such as circular loops in that increased coupling coefficients may be obtained in some cases.

Figure 12A:
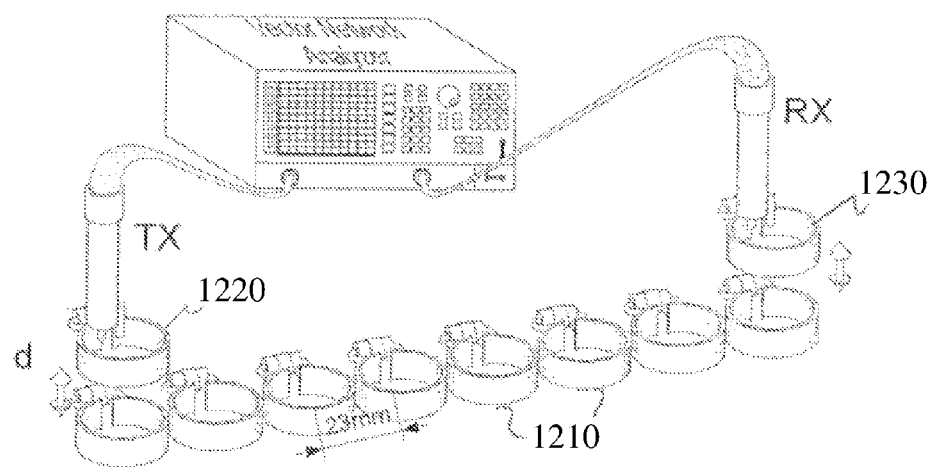
FIG. 12 shows (a) an experimental arrangement of apparatus according to an embodiment of the invention and (b) a plot of data rate and peak value of $S_{21}$ as a function of terminal distance d being a distance between a resonant circuit of the transmitter and receiver and a respective resonant circuit of the common communications device.
Figure 12B:
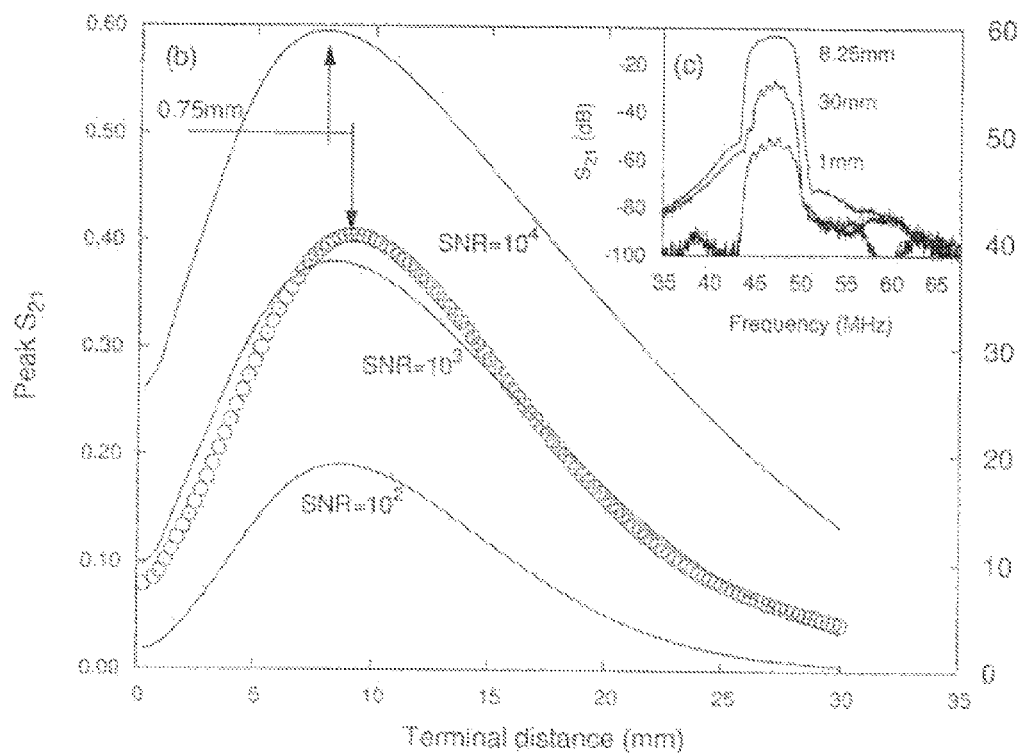

FIG. 12(a) shows an experimental arrangement of apparatus according to an embodiment of the invention in which transmitter and receiver units 1220, 1230 are coupled by means of an MI waveguide (or common communications device) comprising resonator circuits 1210. FIG. 12(b) shows a plot of data rate and peak value of $S_{21}$ as a function of terminal distance being a distance of respective terminals (resonant circuits) of the transmitter and receiver units from the resonant circuits of the device.

The plot inset to FIG. 12(b) shows transfer functions at closest distance (1 mm), optimum coupling distance (8.25 mm) and furthest distance (30 mm). It is to be understood that there is a difference of 0.75 mm between the terminal distances producing a maximum peak value of $S_{21}$ and peak data capacity respectively.

Figure 13:
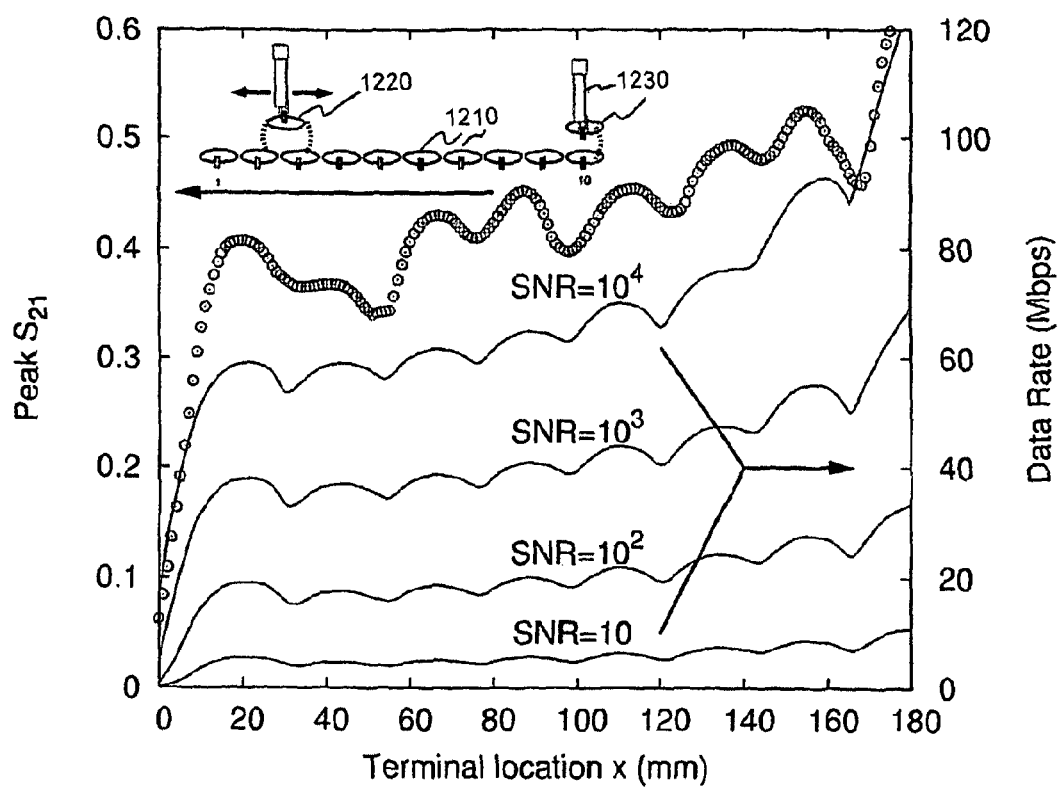
FIG. 13 shows a plot of peak value of $S_{21}$ and data rate as a function of position along a 1-D array of resonant circuits of a terminal (being a resonant circuit) of a transmitter (or receiver) from a terminal of a receiver (or transmitter)

FIG. 13 shows a plot of peak value of $S_{21}$ and data rate as a function of position of the transmitter unit 1220 along the magneto-inductive waveguide.

Figure 14:
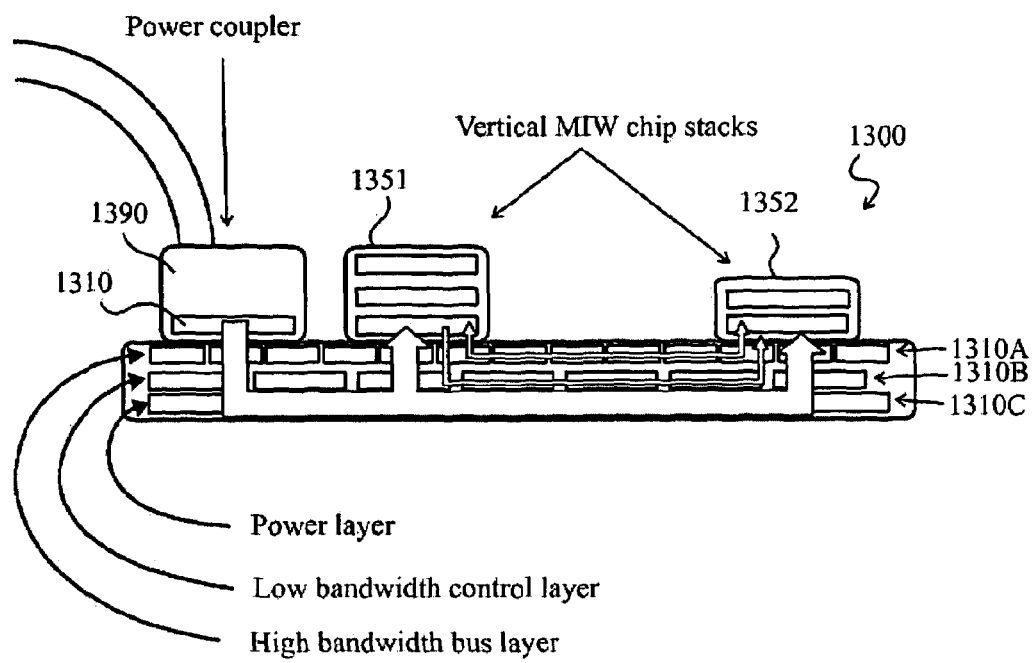
FIG. 14 shows an arrangement of apparatus in which a common communications device is provided having three layers of resonant circuit elements arranged to convey power, control signals and data signals, respectively.

FIG. 14 shows an arrangement of apparatus in which a common communications device 1300 is provided having three layers of resonant circuit elements 1310A, 1310B, 1310C respectively.

A first layer 1310A (also referred to as a data layer 1310A) is arranged to provide a high bandwidth bus layer carrying communications signals.

A second layer 1310B (also referred to as a control layer 1310B) is arranged to provide a relatively low bandwidth control layer carrying control signals. It is to be understood that a bandwidth of a communications channel for control signals can typically be less than that of a communications data channel. The control layer may for example convey signals associated with the control of a device or circuit coupled to the communications device 1300.

A third layer 1310C (also referred to as a power layer 1310C) is arranged to convey power to a unit coupled to the device 1300. Power is provided to and from the power layer 1310C by means of electromagnetic induction.

In the embodiment shown in FIG. 14 power is coupled to the power layer 1310C by a power coupler 1390 in the form of a terminal having a resonant circuit element 1310 arranged to couple power to the power layer 1310C.

Similarly, control signals may be coupled to the control layer 1310B and data signals coupled to the data layer 1310A by respective resonant circuits.

It is to be understood that a resonant frequency of resonant circuits 1310 of the data, control and power layers 1319A, 1310B and 1310C respectively are arranged to be sufficiently different that an amount of cross-communication of data, control and/or power signals is as low as possible.

In some embodiments units such as chip stacks 1351, 1352 are provided on the common communications device 1300 and arranged to be powered thereby and to communicate therethrough. The chip stacks 1351, 1352 may comprise one or more integrated circuits such as memory circuits, microprocessor circuits etc. Each stack 1351, 1352 is provided with a respective resonant circuit element arranged to couple to a respective layer 1310A, 1310B, 1310C of the device 1300. Each resonant circuit element of the stack 1351, 1352 is provided with a suitable filter element to enable filtering out of signals picked up by the circuit element not carrying a signal corresponding to that which the particular resonant circuit element is intended to pick up. Thus, the resonant circuit element of the stack 1351, 1352 corresponding to the data layer 1310A is arranged not to pick up any signals from the control layer 1310B and power layer 1310C.

Any signals from the control or power layers 1310B, 13100 picked up by the resonant circuit element of the stack 1351, 1352 corresponding to the data layer 1310A is filtered out by a suitable filter.

Figure 15:
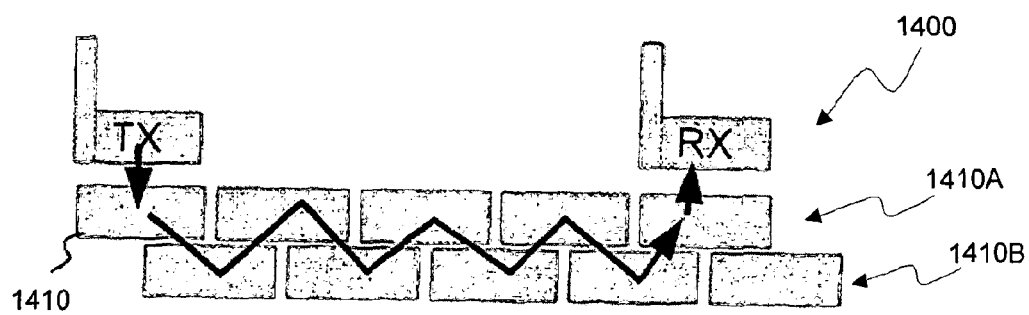
FIG. 15 shows a common communications device having an arrangement of resonant circuit elements which may be described as a 'brick wall' arrangement.

FIG. 15 shows a common communications device 1400 having an arrangement of resonant circuit elements 1410 which may be described as a 'brick wall' arrangement. In the embodiment shown, the device has two layers 1410A, 1410B of resonant elements. The resonant elements 1410 of each layer are substantially coplanar, resonant elements of respective layers being in a staggered relationship with one another in a similar manner to bricks of a brick wall structure. Thus the elements 1410 of respective layers 1410A. 1410B may be described as out of phase with one another by substantially 180°.

The arrangement shown in FIG. 15 has the advantage that increased in-plane coupling of resonant elements may be obtained via alternate vertical coupling of elements. This has the effect of increasing a bandwidth of the communications device 1400 for in-plane signals.

Figure 16:
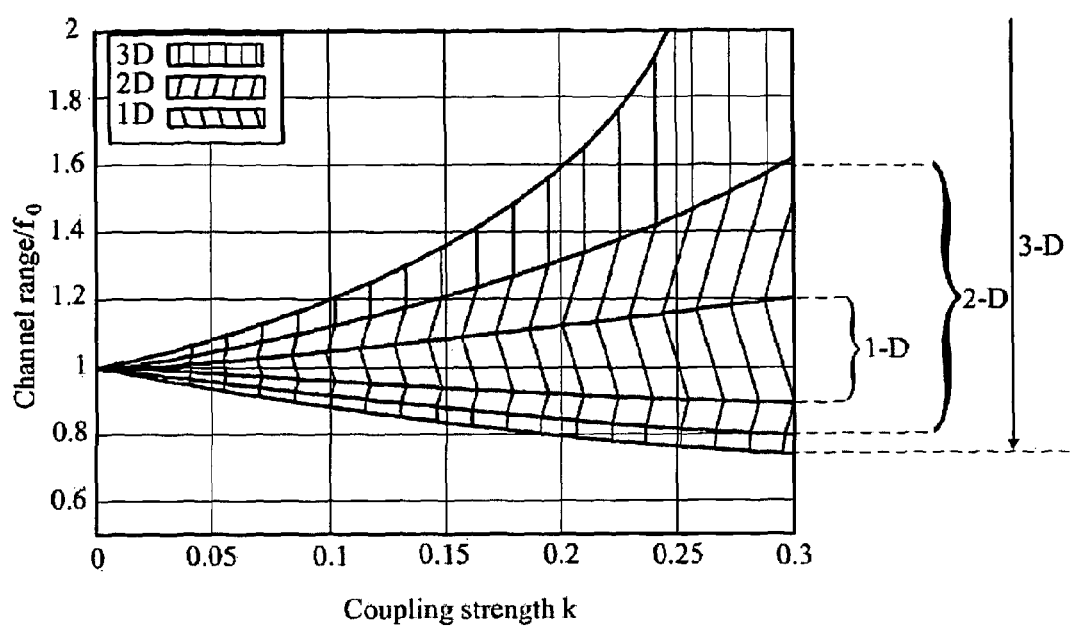
FIG. 16 is a plot showing an envelope of the theoretical limits of bandwidth of a magneto-inductive common communications channel as a function of dimensionality of the supporting array of resonant circuit elements.

FIG. 16 is a plot showing an envelope of the theoretical limits of bandwidth of a magneto-inductive common communications channel as a function of dimensionality of the supporting array of resonant circuit elements. The plot shows channel range/$f_0$ as a function of coupling strength κ for 1D, 2D and 3D arrays of resonant circuits, where $f_0$ is the resonant frequency of the resonant elements.

Values of channel range/$f_0$ are constrained by the equation:

$$\frac{1}{\sqrt{1+\eta|\kappa|}} < \frac{f}{f_0} < \frac{1}{\sqrt{1-\eta|\kappa|}}$$

where η=1, 2, 3 for a 1D, 2D and 3D array respectively, κ is the coupling constant.

Throughout the description and claims of this specification, the words "comprise" and "contain" and variations of the words, for example "comprising" and "comprises", means "including but not limited to", and is not intended to (and does not) exclude other moieties, additives, components, integers or steps.

Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith.

The invention claimed is:

1. A common communications device comprising:
    an array of near-field coupled resonant elements comprising first and second layers of resonant elements, the resonant elements each comprising a loop portion,
    the device being provided in combination with a data transmission unit and a data reception unit, each of the data transmission unit and the data reception unit having a respective coupling portion, the units being arranged to communicate with one another by means of the coupling portion of each unit and the array of near-field coupled elements,
    the coupling portion of the data transmission unit comprising a resonant element comprising a loop portion arranged to be near-field coupled to the loop portion of a first resonant element of the array when the data transmission unit is on a first side of the device, the coupling portion of the data reception unit comprising a resonant element comprising a loop portion arranged to be near-field coupled to the loop portion of a second resonant element of the array not being the first resonant element when the data reception unit is on the first side of the device.

2. The device as claimed in claim 1, wherein at least a pair of resonant elements of the array are coupled to one another in a substantially planar coupled configuration, or in a substantially coaxial configuration.

3. The device as claimed in claim 1, wherein resonant elements of the first and second layers are provided at relative positions arranged to introduce coupling between the first and second layers thereby to enhance an amount of coupling between resonant elements of a given layer.

4. The device as claimed in claim 1, wherein resonant elements of the first layer of resonant elements have a different resonant frequency to resonant elements of the second layer of resonant elements.

5. The device as claimed in claim 1, wherein the resonant frequency of the resonant element of the coupling portion of the data transmission unit or data reception unit is different from the resonant frequency of the resonant elements of the first and second layers.

6. The device as claimed in claim 5, arranged wherein the presence of the coupling portion of the data transmission unit or the coupling portion of the data reception unit in a suitable orientation above the first layer of resonant elements is arranged to cause a shift in a resonant frequency of one or more resonant elements of the array whereby a resonant element of the first or second layer and the resonant element of the coupling portion of the data transmission unit or the data reception unit become coupled.

7. The device as claimed in claim 1, further comprising a third layer of resonant elements, the first and third layers being arranged to sandwich the second layer therebetween.

8. The device as claimed in claim 1, wherein a resonant element of the array is arranged to become disabled whereby the resonant element is no longer coupled to one or more adjacent resonant elements of the array in the event that a magnitude of a current flowing in the loop portion of the resonant element exceeds a prescribed value.

9. The device as claimed in claim 8, wherein the resonant element of the array that is arranged to become disabled is located in the first layer of the device.

10. The device as claimed claim 1, wherein the data transmission unit and the data reception unit are arranged to communicate with one another by at least one of magneto-inductive (MI) waves and electro-inductive (EI) waves propagating through the array of resonant elements.

11. A common communications device comprising first and second layers of arrays of near-field coupled resonant elements, the resonant elements each comprising a loop portion, wherein the resonant elements of the first array are arranged to be near field coupled to the resonant elements of the second array,
    wherein resonant elements of the first layer of resonant elements have a different resonant frequency to resonant elements of the second layer of resonant elements.

12. The device as claimed in claim 11, wherein resonant elements of the first and second layers are provided at relative positions arranged to introduce coupling between the first and second layers thereby to enhance an amount of coupling between resonant elements of a given layer.

13. The device as claimed in claim 11, wherein resonant elements of the first layer are provided at locations that are substantially midway between resonant elements of the second layer when projected onto the second layer whereby the resonant elements of the first and second layers are arranged in a brickwall configuration.

14. The device as claimed in claim 11, wherein
    a plane of each respective loop of resonant elements of the first layer is substantially parallel to a plane of each respective loop of resonant elements of the second layer, or a plane of each respective loop of resonant elements of the first layer is substantially normal to a plane of each respective loop of resonant elements of the second layer.

15. The device as claimed in claim 11, the device for use with at least one of a data transmission unit having a resonant element or a data reception unit having a resonant element, wherein a resonant frequency of the resonant element of the data transmission unit or the data reception unit is different from the resonant frequency of the resonant elements of the first and second layers.

16. The device as claimed in claim 15, arranged wherein the presence of the resonant element of the data transmission unit or the data reception unit in a suitable orientation above the first layer of resonant elements is arranged to cause a shift in a resonant frequency of one or more resonant elements of the device whereby a resonant element of the first or second layer and the resonant element of the data transmission unit or data reception unit become coupled.

17. The device as claimed in claim 11, further comprising a third layer of resonant elements, the first and third layers being arranged to sandwich the second layer therebetween.

18. The device as claimed in claim 11, wherein a resonant element of the first or second layers is arranged to become disabled whereby the resonant element is no longer coupled to one or more adjacent resonant elements of the first or second layers in the event that a magnitude of a current flowing in the loop portion of the resonant element exceeds a prescribed value.

19. The device as claimed in claim 18, wherein the resonant element of the first or second layers is a resonant element of the first layer of the device, and is arranged to become disabled in the event that a magnitude of a current flowing in the loop portion thereof exceeds a prescribed value.

20. The device as claimed in claim 19, wherein a data transmission unit and a data reception unit are arranged to communicate with one another by at least one of magneto-inductive (MI) waves and electro-inductive (EI) waves propagating through the array of resonant elements in at least one of the first and second layers.

21. The device as claimed in claim 11, wherein the loop portions of the resonant elements have free ends, and the free ends form a capacitive gap or the free ends are connected by a capacitor.

22. The device as claimed in claim 21, wherein at least one of the resonant elements of the first and second layers includes more than one loop portion.

* * * * *